(12) United States Patent
Bianchi et al.

(10) Patent No.: US 8,431,254 B2
(45) Date of Patent: Apr. 30, 2013

(54) SOLID JOINT OBTAINED BY HEAT PROJECTION

(75) Inventors: Luc Bianchi, Artannes (FR); Joel Toulc'Hoat, Joue les Tours (FR); Charles Bories, Joue les Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 412 days.

(21) Appl. No.: 12/083,389

(22) PCT Filed: Oct. 9, 2006

(86) PCT No.: PCT/EP2006/067213
§ 371 (c)(1),
(2), (4) Date: Apr. 9, 2008

(87) PCT Pub. No.: WO2007/042505
PCT Pub. Date: Apr. 19, 2007

(65) Prior Publication Data
US 2009/0199947 A1      Aug. 13, 2009

(30) Foreign Application Priority Data
Oct. 11, 2005  (FR) ...................................... 05 53094

(51) Int. Cl.
*B32B 37/06*    (2006.01)
*B32B 3/10*     (2006.01)
*C23C 4/16*     (2006.01)
*C23C 4/06*     (2006.01)

(52) U.S. Cl.
USPC .......... 428/698; 428/155; 428/612; 428/613; 428/609; 428/539.5; 428/545; 427/446; 427/421.1; 156/60

(58) Field of Classification Search .................. None
See application file for complete search history.

(56) References Cited

U.S. PATENT DOCUMENTS 3,852,930 A * 12/1974 Naaman ........................ 52/664
5,242,264 A    9/1993 Kojima et al.
5,561,173 A * 10/1996 Dry ............................... 523/218

(Continued)

FOREIGN PATENT DOCUMENTS

DE   3631536 A1   3/1988
EP   0415217 A    3/1991

(Continued)

OTHER PUBLICATIONS

P. Fauchais. J. Phys. D: Appl. Phys. 37, 2004, R86-R108.*

(Continued)

*Primary Examiner* — Vera Katz
(74) *Attorney, Agent, or Firm* — Nixon Peabody LLP

(57) ABSTRACT

The invention relates to a composite material element (1), the composite material comprising a microfissured matrix (7) in the form of a three-dimensional interconnected network (4) of microfissures exposed on the surface of the ceramic matrix, an additive material (6) consisting of a flux or glass being dispersed in the matrix, the additive material (6) being a material which, when the composite material is brought to a predetermined temperature, softens and migrates by capillarity in the network (4) of microfissures (4) to said surface of the element. The quantity of additive material dispersed initially in the matrix is in a sufficient proportion compared to the matrix intended to coat a surface (5) of the composite material element left exposed so as to create a gas-tight barrier.

15 Claims, 2 Drawing Sheets

U.S. PATENT DOCUMENTS

| | | | | |
|---|---|---|---|---|
| 5,660,624 | A * | 8/1997 | Dry | 106/677 |
| 5,674,802 | A * | 10/1997 | Sheppard | 502/439 |
| 5,725,955 | A | 3/1998 | Tawil et al. | |
| 5,919,493 | A * | 7/1999 | Sheppard et al. | 425/174.2 |
| 5,989,334 | A * | 11/1999 | Dry | 106/677 |
| 6,245,424 | B1 * | 6/2001 | Lau et al. | 428/368 |
| 6,261,360 | B1 * | 7/2001 | Dry | 106/677 |
| 6,271,158 | B1 | 8/2001 | Xue et al. | |
| 6,527,849 | B2 * | 3/2003 | Dry | 106/677 |
| 6,541,146 | B1 | 4/2003 | Xue et al. | |
| 7,022,179 | B1 * | 4/2006 | Dry | 106/711 |
| 7,224,862 | B2 * | 5/2007 | Noda et al. | 385/24 |
| 7,673,433 | B2 * | 3/2010 | Rutman et al. | 52/843 |
| 2001/0050032 | A1 * | 12/2001 | Dry | 106/677 |
| 2002/0094448 | A1 * | 7/2002 | Rigney et al. | 428/633 |
| 2006/0169180 | A1 * | 8/2006 | Dry | 106/711 |
| 2006/0286428 | A1 | 12/2006 | Weng et al. | |
| 2008/0050612 | A1 * | 2/2008 | Dry | 428/689 |
| 2008/0053338 | A1 * | 3/2008 | Dry | 106/642 |
| 2008/0057296 | A1 * | 3/2008 | Dry | 428/320.2 |
| 2008/0058445 | A1 * | 3/2008 | Dry | 523/206 |
| 2008/0107888 | A1 * | 5/2008 | Dry | 428/313.3 |
| 2008/0145392 | A1 * | 6/2008 | Knaack et al. | 424/423 |

FOREIGN PATENT DOCUMENTS

| | | |
|---|---|---|
| EP | 1737059 A1 | 12/2006 |
| GB | 2217349 A | 10/1989 |
| WO | 9954131 A1 | 10/1999 |
| WO | 0217416 A2 | 2/2002 |
| WO | WO2004002655 A1 * | 1/2004 |

OTHER PUBLICATIONS

Fauchais P. et al., "Plasma Spraying: a Review," Ann. Phys. Fr., vol. 14, 1989, pp. 261-310. Abstract. (P. Fauchais et al, "La Projection Par Plasma: Une Revue," Annales De Physique, vol. 14, No. 3, Jun. 1989, pp. 261-310.).

International Search Report and Written Opinion in International Application No. PCT/EP2006/067213, dated May 4, 2007. (English translation of Written Opinion included).

* cited by examiner

SOLID JOINT OBTAINED BY HEAT PROJECTION

CROSS REFERENCE TO RELATED APPLICATIONS or PRIORITY CLAIM

This application is a national phase of International Application No. PCT/EP2006/067213 entitled "SOLID SEAL WHICH IS OBTAINED BY MEANS OF THERMAL SPRAYING", which was filed on Oct. 9, 2006, and which claims priority of French Patent Application No. 05 53094, filed Oct. 11, 2005.

TECHNICAL FIELD

The invention relates to the field of joints and seals operating at high temperature with a particular, but not exclusive, application in the case of Solid Oxide Fuel Cells, or SOFCs, for which the operating temperature is typically between 600 and 1000° C. inclusive.

STATE OF THE PRIOR ART

A fuel cell is a device in which a first reagent, a fuel such as hydrogen, reacts electrochemically with a second reagent, an oxidant such as oxygen, to produce a direct electrical current and heat. A fuel cell consists of two electronic porous and conducting electrodes: an anode and a cathode separated by an electronic insulating but ionic conducting electrolyte (solid in the case of SOFCs). The anode generally consists of a cermet (association of a ceramic and a metal) nickel—zirconium, the cathode of doped lanthanum manganite. The most commonly used material for the electrolyte is zirconium doped with yttria.

In a SOFC, oxygen reacts at the cathode with electrons to give oxide ions which migrate through the electrolyte to the anode. The fuel injected at the anode reacts with the oxide ions to form water and electrons. The electrons circulate from the anode to the cathode by traversing an external electrical circuit.

Each elementary cell, consisting of an anode, an electrolyte and a cathode produces hardly more than one volt. To achieve higher voltages which facilitate power conversion downstream of the fuel cell, several cells are electrically connected in series and combined into stacks. A stack of cells consists of several cells separated by plates termed "bipolar" or "interconnectors". An interconnector is an electronic conductor and is placed between the anode and cathode of two adjacent cells. This interconnector can collect current and in some cases feed gases to the electrodes.

One of the major difficulties in using current generators of the solid fuel cell type (SOFC) is managing the sealing between the two gas systems, fuel (hydrogen) and oxidant (air) which, if it is not done correctly, can lead to internal combustion reactions in the cell, which prohibit ideal operation.

The joints currently used for sealed assemblies in SOFC stacks are sometimes solid with, in particular, the use of mica sheets, but most frequently take the form of vitreous compositions or glass-ceramic paste mixtures (because of their dispersion in a solvent and/or organic binder) for use on the parts to be assembled and which are consolidated by crystallisation or fritting at the operating temperature of the SOFCs.

This last type of joint is generally fragile and hardly appropriate for accommodating differences of expansion coefficients for the various constituents of SOFC stacks, with the consequences that there are problems with cracking in service and poor resistance to thermal cyclings.

Some alternatives have been proposed to overcome these difficulties. The majority of these concentrate on joints based on ceramic fibres impregnated with ceramic and/or glass particles which thus maintain a certain elasticity at working temperature and are more compatible with the thermal cyclings imposed on SOFC cells. On this topic, we can refer to the documents WO-A-02/17416, US-A-6 271 158 and US-A-6 541 146.

Owing to the paste nature of the joints, methods for forming the joints on the parts to be assembled, enabling fairly satisfactory control of the thickness, are generally serigraphy or compressed-air spraying as described in the document WO-A-99/54131. In the case of fibrous joints, mechanical pre-compaction in some cases allows the manufacture of auto-structuring joints.

The ceramic deposits made by plasma spraying, for reasons intrinsic to the method, have an extensively microfissured lamellar microstructure, induced by the stacking of elementary particles capable of impacting the part to be coated. On this topic, we can refer to the article "Plasma spraying: a review" by P. Fauchais et al., Ann. Phys. Fr., 14 (1989), pages 261 to 310. The coatings thus obtained conventionally have a total porosity of approximately 10%, in the main exposed, owing to the three-dimensional interconnection of a network of cracks. This network is here the direct consequence of the relaxation of the stresses produced during the sudden cooling of particles in contact with the substrate and secondarily by stacking faults. This is the result of a fault in the sealing of deposits made by plasma spraying.

Gas-tight deposits can, however, be produced by plasma spraying in the particular context of SSCC (for "Self Sealing Ceramic Coatings") applications intended for anti-corrosion protection of metallic parts. The principle here is to form closed porosity in the deposit by enabling oxidation reactions by the materials constituting the coating in order to form stable oxides with a volume increase which has the effect of plugging the network of cracks which interconnects the pores. On this topic, we can refer to the documents DE-A-36 31 536 and GB-A-2 217 349.

DESCRIPTION OF THE INVENTION

One object of this invention consists of providing a composite material element having a surface provided with a gas-tight barrier.

Another object of this invention consists of providing a solid joint procuring an effective seal.

Another object of this invention consists of providing a leakproof solid joint different from those of the prior art.

In this case, a solid joint with a ceramic matrix, loaded with glass or ceramic flux particles, produced by thermal spraying. This can produce effective sealing between two layers forming a SOFC-type solid fuel cell. The solid joint can, for example, be produced by plasma spraying on one or both sides of the layers to be assembled. The joint is solid, non-deformable and adheres to its support at ambient temperature. It is formed and acquires its properties during commissioning at the temperature of the SOFC by means of a migration mechanism in the vitreous phase by capillarity in the volume of the ceramic matrix, preferably towards the interface to be assembled.

The mechanisms used in the leakproof joint according to this invention differ fundamentally from those used in the documents DE-A-36 31 536 and GB-A-2 217 349 cited above insofar as, for this invention, these are not chemical reactions in the volume of the deposit which are sought and produced, but a migration of the second vitreous phase by capillarity in the network of microfissures with a double effect, on one hand sealing the deposit in its volume and on the other hand coating the ceramic matrix to provide the sealing function with the facing surface.

The object of the invention is therefore a composite material element, the composite material comprising a microfissured matrix in the form of a three dimensional interconnected network of microfissures exposed on the surface of the matrix, an additive material consisting of a ceramic or glass flux being dispersed in the matrix, the additive material being a material which, when the composite material is brought to a predetermined temperature, softens and migrates by capillarity in the network of microfissures towards said surface of the element, the quantity of additive material dispersed initially in a proportion compared with the matrix sufficient to coat an exposed surface of the composite material so as to create there a gas-tight barrier there.

The matrix can consist of at least one material chosen from metallic oxides, carbides, nitrides, silicides and borides. It can consist of at least one material chosen from the metals and metallic alloys.

The additive material can consist of at least one material chosen from a glass, a ceramic flux, a metal and a metallic alloy.

The composite material element can comprise between 5% and 85% by weight of additive material.

Said predetermined temperature can be a temperature in the range extending from 100° C. to 1500° C. inclusive.

The object of the invention is also a solid joint consisting on one hand of a composite material element as defined above, this composite material element having been brought to said predetermined temperature so that a layer of additive material covers said surface left exposed.

In this solid joint, the composite material element can be an element deposited initially so as to adhere by thermal spraying to a first part, the additive material coating covering said surface left exposed to provide said gas-tight barrier with a second part opposite this surface left exposed. The composite material element can also be an auto-structuring element, i.e. an element initially having a surface left exposed for a first part to be joined and a surface left exposed for a second part to be joined, a coating of additive material covering the surfaces left exposed to provide a gas-tight barrier with each of the two parts.

The object of the invention is also a method for manufacturing a composite material element as defined above, comprising a step of thermal spraying of a material intended to form the ceramic matrix and a material intended to form the additive material, on at least one recipient surface.

Thermal spraying can be chosen from the techniques of plasma spraying, spraying by oxy-acetylene flame, HVOF ("High Velocity Oxy Fuel") spraying, HVAF ("High Velocity Air Fuel") spraying, detonation gun spraying, wire arc and powder arc spraying, direct current arc plasma spraying, inductive plasma spraying, cold dynamic spraying (or "Cold Spray") and a combination of at least two of these techniques.

A porogenic material can also be sprayed during the thermal spraying step.

The recipient surface can be a surface of a first part intended to be connected a second part by means of a solid joint according to the invention.

The invention then also has a method of manufacturing a solid sealed joint comprising:
application of the method for manufacturing the composite material element on said surface of the first part,
placement of a surface of said second part opposite said surface left exposed,
bringing of the composite material element to said predetermined temperature to obtain the coating of said surface left exposed, said coating capable of adhering to the surface of said second part placed opposite it.

The recipient surface can also be a stripping interface for recovering the composite material element.

The invention then also has a method of manufacturing a solid sealed joint comprising:
interposition of the composite material element, obtained on the stripping interface, between a first surface of a first part and a second surface of a second part, the first surface and the second surface being opposite.
bringing the composite material element to said predetermined temperature to obtain the coatings of the surfaces of the composite material element left exposed, said coatings being capable of adhering to the first surface of the first part on one hand and the second surface of the second part on the other hand.

A pressure can be exerted between the first and second parts, tending to draw the first surface of the first part closer to the second surface of the second part, while it is being brought to the predetermined temperature, in order to improve the adherence of the coating or coatings.

BRIEF DESCRIPTION OF THE DRAWINGS

The invention will be better understood and other advantages and features will become apparent on reading the description which follows, given as a non-limiting example, accompanied by the appended drawings, among which.

DETAILED EXPLANATION OF PARTICULAR EMBODIMENTS

The invention relates to a solid joint working at high temperature, produced by plasma spraying and applicable in particular, but not exclusively, to the case of leakproof assembly of SOFC-type fuel cell elements. The working temperature range in the case of the SOFC application is from 600 to 1000° C. including conditions of thermal cycling of the ambient temperature to the maximum usable temperature.

In this description, the terms "ceramic", "glass" or "flux" will be used for nonmetallic and solid inorganic materials having bonds of the covalent or ionic type. This includes metallic oxides and, generally, all non-oxide materials of the carbide, nitride, silicide, boride and other types, as well as all defined mixtures or compounds obtained from these constituents. A glass will be distinguished from a ceramic by its degree of crystallisation.

The terms "microfissure" and/or "network of microfissures" applied to cases of plasma deposits of ceramics relate to cracks which occur owing to the relaxation of thermal stresses, schematically in a plane perpendicular to the direction of growth of the deposit between the distributed particles (lamellae) and parallel to the direction of growth of the deposit inside the lamellae, in order to form an interconnected exposed porosity network in the volume of the coating. The characteristic dimensions of these cracks observable on a transverse section on a coating are approximately 0.1 µm to 1 µm in width, this range being capable of varying according to the nature of the sprayed material and the conditions of formation. Particle stacking faults during the construction of the deposit are for their part responsible for the formation of "closed porosities" of circular shape and of a size generally larger than one micrometer or even some ten micrometers. This terminology is communally accepted by those skilled in the art.

The term "plasma forming" refers to a variation of the method for depositing by thermal spraying for which, via a stripping-aid interface, the deposit produced on its substrate can be unbonded to produce a thin auto-structuring layer, which can be handled or machined, reproducing the geometry of the substrate on which it was formed.

The invented joint is characterised by composite plasma deposit consisting of a ceramic matrix in which are dispersed particles of a ceramic or glass flux which will be referred to subsequently as "additive material". The deposit or solid joint thus obtained has the characteristic microstructure described schematically in FIG. 1.

Figure 1:
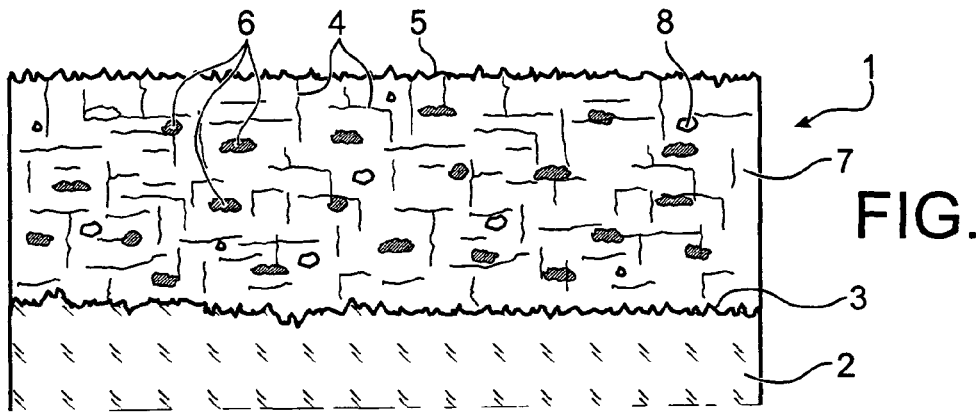
FIG. 1 is a transverse sectional view of a composite material joint according to this invention, before bringing it to temperature.

FIG. 1 shows, as a transverse section, a composite material element 1 deposited, by a plasma depositing technique, on a substrate 2 which can be metallic, semiconductor or ceramic. The surface 3 of the substrate 2 on which the composite material is deposited is a rough surface which allows good bonding of the composite material.

As conventionally observed for plasma deposits of ceramics, the matrix is in this case extensively microfissured. It is this three-dimensional interconnected network of microfissures 4 exposed on the surface 5 of the coating which is used for a migration by capillarity of the additive material towards the surface of the material to form the joint. This migration is made possible when the working temperature of the joint softens the additive material, leading to a sufficiently low viscosity and when there is no limiting reaction between the additive material and the matrix. These are the final criteria which condition the choice of the matrix material—additive material pair.

Obtaining the network of microfissures necessary for the migration of the additive material, if it is not obtained directly from the production process, as during the spraying by plasma of a ceramic, for example, could be created "artificially" by using porogenic agents coupled with spraying of the matrix.

The sectional view in FIG. 1 shows the additive material 6 dispersed in the ceramic matrix 7 as well as the voids 8 due to the natural closed porosity of the material deposited thermally.

Figure 2A:
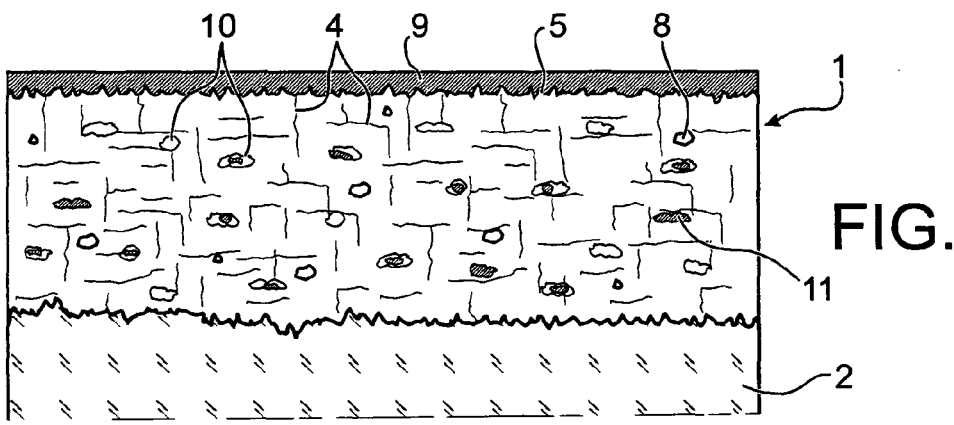
FIG. 2A represents the joint from FIG. 1 after bringing to temperature for a use as a leakproof joint.
Figure 2B:
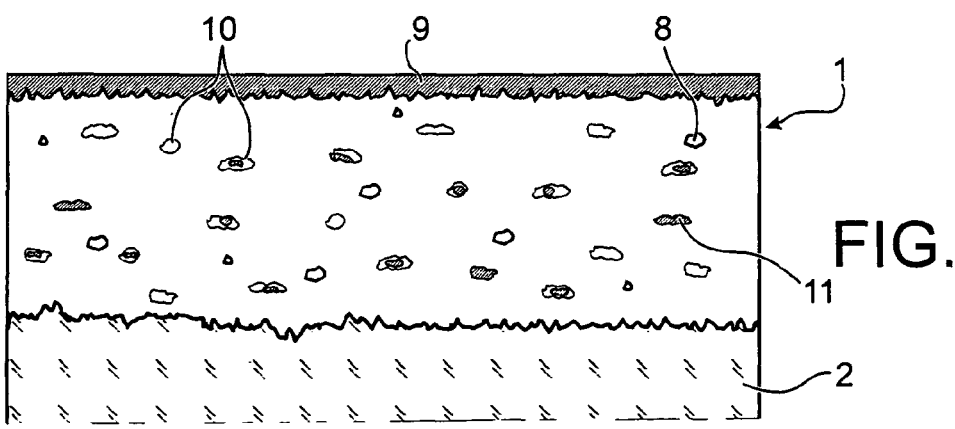
FIG. 2B represents the joint from FIG. 1 after returning to ambient temperature.

The micro-structural development over a sample taken from the joint after use at 900° C. or, more generally, in the compatible temperature range of the matrix-additive material pair in order to explain the working mechanisms of the joint is shown in FIGS. 2A and 2B.

The act of bringing the joint to its working temperature allows a sufficient softening of the additive material, although the ceramic matrix does not undergo any modification, so that the latter could migrate by capillarity into the network of microfissures towards the exposed surface of the matrix which will be coated by the surplus additive material.

FIG. 2A shows that the exposed surface 5 of the composite material element 1 is covered by a layer 9 of flux. There are still closed porosities 10 with or without flux residue, residual particles of flux 11 and natural closed porosities 8 in the composite material. The network 4 of microfissures is filled with flux.

After cooling, and because of the low optical contrast of the flux and of the ceramic matrix, the microfissures characteristic of the matrix filled by the additive material are no longer visible and there is only a residual closed porosity produced either by the initial presence of closed porosities due to particle stacking faults during the construction of the coating or by the presence of cavities which initially contained particles of the additive material and which are to be seen in part or totally emptied by the migration of the additive material into the microfissures towards the surface of the deposit. These cavities can this be similar to "reservoirs" of additive material. The filling of the microfissures by the additive material during implementing at working temperature also has the advantage of making the ceramic matrix, initially scarred with microfissures, gas-tight. This is what FIG. 2B shows.

Figure 3:
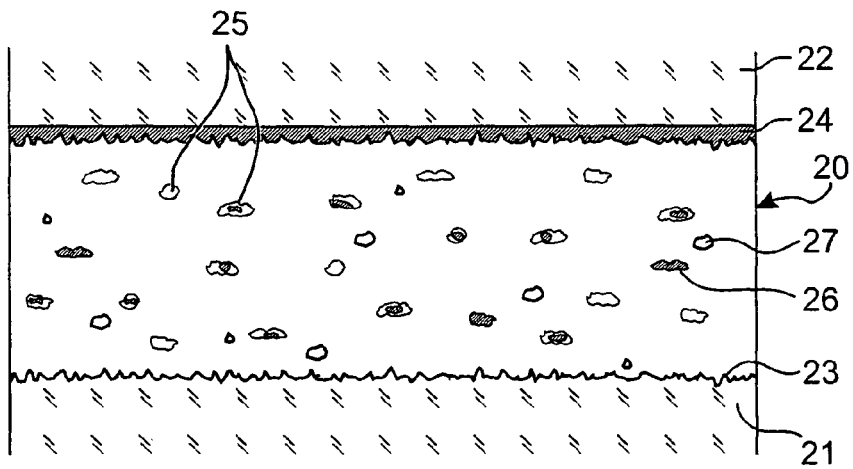
FIG. 3 is a transverse sectional view of a leakproof joint according to the invention, deposited on a first element and providing a seal with a second element to be assembled.

FIG. 3 is a transverse sectional view of a leakproof joint according to the invention, deposited on a first element and providing a seal with a second element to be assembled. This is the layer of additive material having migrated to the surface of the ceramic matrix which is used to create a gas-tight barrier when the joint comes into contact with a surface to be assembled.

In the embodiment in FIG. 3, the joint 20 is sprayed, for example by plasma, on to the rough surface 23 of one of the two elements to be assembled, for example on the element 21. The second element 22 is then brought into direct contact with the exposed surface of the joint 20. So as to guarantee intimate contact between this second part and the joint, a load can be applied. The whole is then brought to the working temperature of the joint, thus producing migration by capillarity of the additive material to the surface of the ceramic matrix. By viscous flow of the additive material at the working temperature, the latter can then fill the interstices due to contact faults between the joint 20 and the second element 22 to form a gas-tight barrier layer 24. In the joint 20, we can see closed porosities 25 with or without flux residue, residual flux particles 26 and natural closed porosities 27.

The thickness of the layer of additive material forming this leakproof barrier will be related directly to the surface condition of the joint and of the element opposite and thus the very nature and micro-structure of the materials in contact. This thickness can be approximately one micrometer up to a few tens of micrometers for the surface conditions of smooth or rough surface contact parts.

In the preceding example, the joint is deposited by plasma spraying on one of the two plane surfaces to be assembled, the other surface then being brought directly into contact with the joint. The solid character of the joint induced by the ceramic matrix does not restrict its use to this type of configuration. Accordingly, the ability to obtain by plasma-forming an auto-structuring joint with thicknesses typically in the range of 50 µm to several millimeters allows direct insertion of the joint between the two surfaces to be assembled. In this case, the additive material, while the joint is brought to temperature, will coat the two exposed surfaces of the matrix to ensure sealing as shown in the diagram in FIG. 4.

Figure 4:
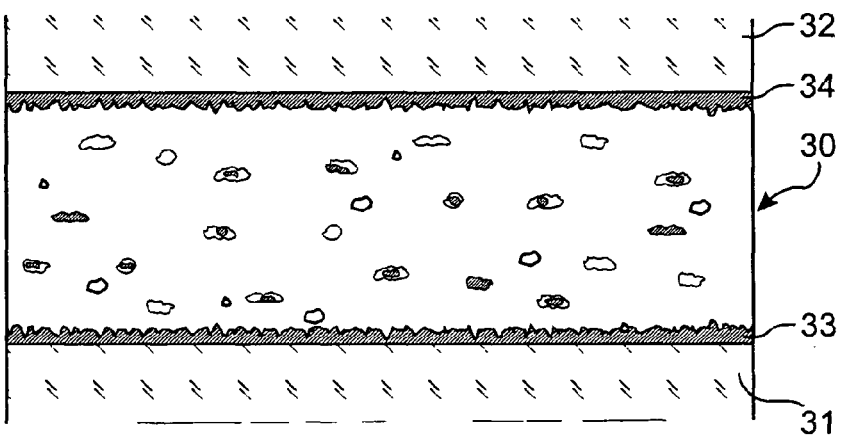
FIG. 4 is a transverse sectional view of a plasma joint formed according to the invention and providing a seal for two elements to be assembled.

In FIG. 4, the plasma-formed joint 30 connects the plane surfaces facing the elements 31 and 32 by means of the gas-tight layers 33 and 34 formed from the flux.

The forms accessible for the joint are thus not limited to plane structures, but can be extended to all types of three-dimensional geometries accessible by plasma spraying. We can cite examples of coatings on tubes, concave or convex surfaces or even a combination of these geometries.

Because of the migration mechanisms of a viscous additive material at the temperature of use, the joint allows metal-metal, ceramic-ceramic and ceramic-metal assemblies, regardless of their surface condition.

The joint could be deposited equally on one of the two surfaces to be assembled, on both surfaces or even inserted in auto-structuring form between the two surfaces.

An example will now be given in the case of a SOFC application for which a joint has been deposited in the form of a ring of 20 mm internal diameter and 30 mm external diameter, with a thickness of 150 μm on a plane stack of cells in order to separate the hydrogen system from the air system according to the configuration described in FIG. 5.

Figure 5:
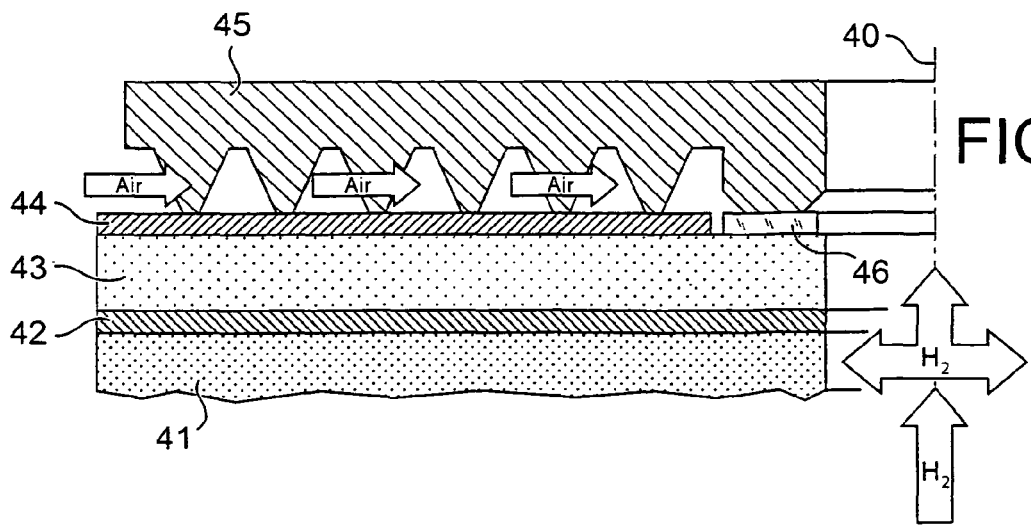
FIG. 5 is a transverse sectional view of a part of a solid oxide fuel cell comprising a leakproof joint according to this invention.

FIG. 5 is a transverse section through a part of a fuel cell. Only the part located to the left of the axis of symmetry has been depicted. It shows a porous diffuser 41 of anodic gas, a cermet electrode 42, a dense ceramic electrolyte 43, a porous ceramic cathode 44 and a metallic bipolar plate 45. A leak-proof ring-shaped joint 46, centred on the axis 40, is placed between the surfaces of the electrolyte 43 and the bipolar plate 45. The joint 46 is formed by plasma spraying on the metallic bipolar plate 45 and placing in contact with the yttriated zirconium electrolyte 43. A load of 200 g.cm$^{-2}$ is applied to this stack and the working temperature is set to 900° C.

The ceramic matrix of the joint used is yttriated zirconium (8% molar) and the additive material is a ceramic flux, reference C 105, available from DMC$^2$ France S. A., and incorporated at a ratio of 20% by weight in the matrix.

Under these conditions, the performance figures obtained for a stack of 5 cells are identical to those obtained for single SOFC cells of the same type tested in a configuration not requiring the two gas systems to be separated. Moreover, a post mortem analysis of the cells of the stack does not reveal any trace of internal combustion between the air and the hydrogen which could be attributed to a malfunction of the joint.

Measurements made on this joint under experimental conditions identical to those of the stack, at 900° C. using nitrogen lead to a leakage rate of 4.2 10$^{-3}$ mbar.l/s with an imposed pressure drop of 70 mbars.

The joint according to the invention has various advantages beyond the fact that it creates a gas-tight barrier. The proportion by volume of material in the matrix can be modulated to a considerable degree according to applications as long as the structuring character of the matrix is unaltered. The solid joint obtained can be machined and is inert at ambient temperature and is formed at the working temperature. Because of the viscous nature of the flux in the surface of the ceramic matrix, the joint can accommodate to some extent the distortions and slight movements of the elements to be assembled while they are brought to temperature. Owing to the small thickness to be filled between the ceramic matrix and the surface of the element to be assembled, the joint can minimise the potential surface for passing or leaking gases. It enables a leakproof bond between two metals, two ceramics or between a metal and a ceramic, regardless of its surface condition.

The joint can be deposited by thermal spraying on one of the two surfaces to be assembled or even produced in an auto-structuring manner then to be placed between the two surfaces to be assembled.

The joint can, because of its solid nature and its methods of forming, be produced on all types of geometries and profiles (tubes, concave or convex surfaces, planes, or their combinations) accessible by the proposed depositing techniques.

The thickness of the joint is variable from a micrometer to several millimeters. For a single joint, this thickness can be constant or variable in a controlled manner over the proposed range.

The joint, because of the solid nature of its matrix, has no shrinkage or more generally dimensional variations other than those produced by its thermal expansion during commissioning.

The joint can be an electrical insulator, an electric conductor or an ionic conductor according to the choice of the matrix material and additive material pairs.

The matrix material can be a ceramic. This includes metallic oxides and, generically, all non-oxide materials of the carbide, nitride, silicide, boride and other types, as well as all defined mixtures or compounds obtained from these constituents. Metals or metal alloys can also be used.

The additive material can be generically a glass, a ceramic flux or a metallic alloy.

The joint maintains its sealing performances after thermal cycling of its working temperature at ambient temperature. Its working temperature can cover a very wide range, from 100° C. to over 1500° C., depending on the choice of the matrix material and additive material pair.

The fields for use of the joint can relate to, but not be confined to:
chafing applications in temperature,
anti-corrosion protection,
brazing,
sealed high temperature assemblies for SOFCs or any other application.

The invention claimed is:

1. A composite material element, the composite material element comprising a microfissured ceramic matrix forming a three-dimensional interconnected network of microfissures created by relaxation of thermal stresses and exposed on a surface of the matrix, the microfissured ceramic matrix consisting of at least one material chosen from among metal, metallic alloys, metallic oxides, carbides, nitrides, silicides and borides, a quantity of additive material consisting of at least one material chosen from among a glass, a ceramic flux, a metal and a metallic alloy, being dispersed in the matrix, the additive material being a material chosen to soften and migrate by capillarity in the network of microfissures to a surface of the element when the composite material element is brought to a predetermined temperature, the quantity of additive material dispersed in the matrix being in a sufficient proportion, compared to the matrix, to coat a surface of the composite material element left exposed so as to create there a gas-tight barrier.

2. Composite material element according to claim 1, comprising between 5% and 85% by weight of additive material.

3. Composite material element according to claim 1, in which said predetermined temperature is a temperature in the range extending from 100° C. to 1500° C.

4. Solid joint constituted from a composite material element according to claim 1, this composite material having been brought to said predetermined temperature in order that a coating of additive material covers said surface left exposed.

5. Solid joint according to claim 4, in which the composite material element is an element deposited initially so as to adhere by thermal spraying to a first part, the additive material coating covering said surface left exposed to provide said gas-tight barrier with a second part opposite this surface left exposed.

6. Solid joint according to claim 4, in which the composite material element is an auto-structuring element, wherein an element initially having a surface left exposed for a first part to be joined and a surface left exposed for a second part to be joined, a coating of additive material covering the surfaces left exposed to provide a gas-tight barrier with each of the two parts.

7. Method for manufacturing a composite material element according to claim 1, comprising a step of thermal spraying of a material intended to form the ceramic matrix and a material intended to form the additive material, on at least one recipient surface.

8. Method according to claim 7, in which thermal spraying is chosen from among the techniques of plasma spraying, oxyacetylene flame spraying, HVOF spraying, HVAF spraying, detonation gun spraying, wire arc and powder arc spraying, direct current arc plasma spraying, inductive plasma spraying, cold dynamic spraying and a combination of at least two of these techniques.

9. Method according to claim 7, in which the recipient surface is a surface of a first part intended to be bonded to a second part by means of the solid joint.

10. Method for manufacturing a leakproof solid joint comprising:
application of the method according to claim 9 to said surface of the first part,
placement of a surface of said second part opposite said surface left exposed,
bringing of the composite material element to said predetermined temperature to obtain the coating of said surface left exposed, said coating capable of adhering to the surface of said second part placed opposite it.

11. Method according to claim 10, in which a pressure is exerted between the first and second part, tending to draw the first surface of the first part closer to the second surface of the second part, while it is being brought to said predetermined temperature, in order to improve adherence of the coating or coatings.

12. Method according to claim 7, in which the recipient surface is a stripping interface for recovery of the composite material element.

13. Method for manufacturing a leakproof solid joint, comprising:
interposing of the composite material element obtained by the method according to claim 12 between a first surface of a first part and a second surface of a second part, the first surface and the second surface being opposite each other,
bringing the composite material element to said predetermined temperature to obtain coatings on the surfaces of the composite material element left exposed, said coatings adhering to the first surface of the first part and the second surface of the second part.

14. Method according to claim 13, in which a pressure is exerted between the first and second part, tending to draw the first surface of the first part closer to the second surface of the second part, while it is being brought to said predetermined temperature, in order to improve adherence of the coating or coatings.

15. Method according to claim 7, in which a porogenic material is also sprayed during the thermal spraying step.

* * * * *

UNITED STATES PATENT AND TRADEMARK OFFICE
CERTIFICATE OF CORRECTION

PATENT NO. : 8,431,254 B2  Page 1 of 1
APPLICATION NO. : 12/083389
DATED : April 30, 2013
INVENTOR(S) : Bianchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this
Eighth Day of September, 2015

Michelle K. Lee
*Director of the United States Patent and Trademark Office*